United States Patent Office 3,492,094
Patented Jan. 27, 1970

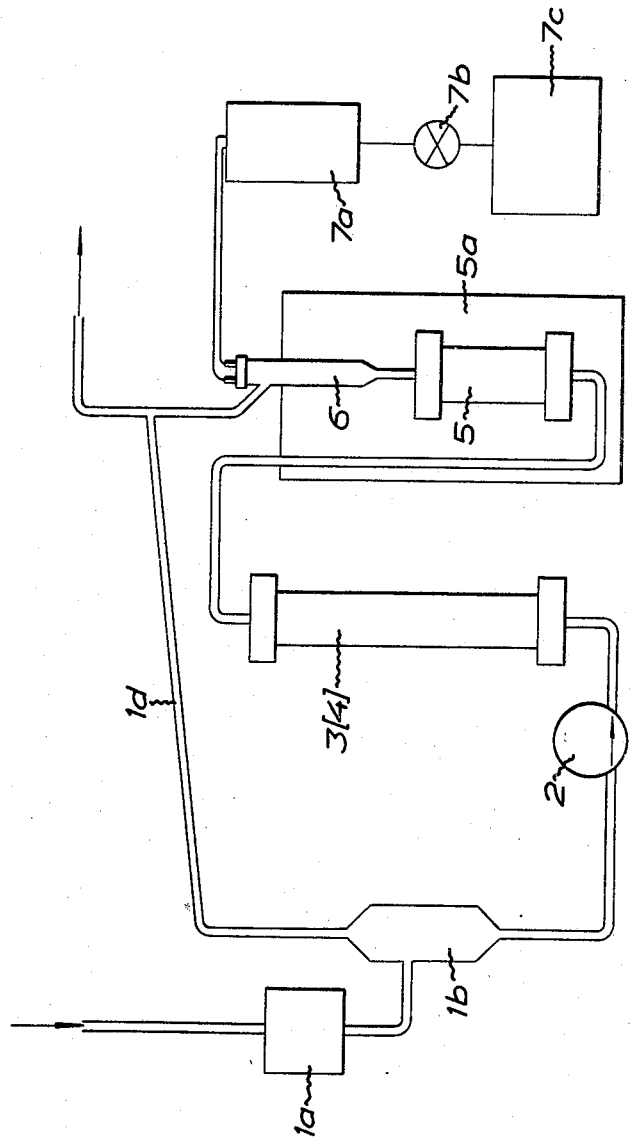

3,492,094
METHOD AND APPARATUS FOR DETECTING TRACES OF SOLUBLE CARBOHYDRATES IN A RETURN FLOW OF WATER IN AN INDUSTRIAL PROCESS
Jan A. Tjebbes, Lund, and Ferenc J. Deák, Malmo, Sweden, assignors to Svenska Sockerfabriks Aktiebolaget, Malmo, Sweden, a corporation
Filed Aug. 11, 1967, Ser. No. 660,087
Claims priority, application Sweden, Aug. 16, 1966, 11,078/66
Int. Cl. G01n 33/00, 33/02, 27/00
U.S. Cl. 23—230    5 Claims

ABSTRACT OF THE DISCLOSURE

A method and apparatus for detecting traces of soluble carbohydrates in a return flow of water in an industrial process. In the method a branch flow of the return flow is led through the apparatus comprising a combination of means for deaeration, filtration, ion exchange or electrodialysis, catalytic reaction, measuring electric conductivity or hydrogen ion activity, and recording the values measured. During the passage of the branch flow through the means for the catalytic reaction any soluble carbohydrates present in the branch flow are oxidized with oxygen to dissociated uronic acids, the conductivity or hydrogen ion activity of which is determined as a measure of the content of soluble carbohydrates in the return flow.

---

Industries often use condensate from chemical apparatus, such as cooking vats, evaporators and the like, as feed water for steam-generating boilers. In a sugar factory, it happens from time to time that sugars enter such condensates due to leakage, boiling-over or the like, and steps must therefore be taken to present such condensate containing sugars from entering the boilers where the sugar can cause considerable damage owing to the corrosive attack on the hot heating surfaces of the boilers. The term "sugars" used in the specification below includes soluble carbohydrates, such as glucose, saccharose, and soluble starch. In the sugar industry, collected condensate for use as feed water in the steam-generating plant is therefore regularly checked, and this is done at present by sampling the condensate every fifteen minutes, before it is supplied as feed water, and if the sample reacts positively to sugar, the entire condensate is led off to the drain. The sample is examined by means of a naphthol test which is based upon a reaction between sugar and alpha-naphthol in sulfuric acid under coloration. These tests must be carried out every fifteen minutes by the boiler attendant who performs a reaction in a test tube with highly corrosive chemicals and then judges by visual inspection if coloration has occurred and, if so, with what intensity.

In the sugar industry, it has long been tried to find a more reliable and continuous method of detecting traces of sugars in return flows of water, and commercially available equipment for this purpose exists. All these equipments are based upon an automatization of the color reaction and thus suffer from the inconvenience that they require receptacles with concentrated sulfuric acid, and this is not particularly attractive in a sugar factory. Moreover, these equipments are complicated, delicate and rather expensive.

These inconveniences are eliminated by the method and apparatus of the invention which offers a considerable improvement as compared to prior art methods and apparatus. By the method of the invention it is possible to quickly to record a content of sugars in a return flow, and water containing sugars which is unsuitable as feed water, can be disconnected from the feed water line of the steam-generating plant without any appreciable delay. The apparatus of the invention is a simple, robust and reliable instrument which costs but a fraction of the prior art equipment. Thus, it is possible to install the apparatus for detecting traces of sugars at the condensate collection points which occur at various stations in the factory, thereby enabling instant warning and also completely automatic disconnection of but that part of the feed water which actually is contaminated by sugars, while the other return water runs as usual. In view hereof, this gives the further advantages that the operator is able more quickly to localize the fault which has caused the content of sugars, and can take steps to eliminate the fault.

The invention relates to a method of detecting traces of soluble carbohydrates in a return flow of water in an industrial process, for instance condensate or feed water for the steam-generating plant of a sugar factory. In the method of the invention a branch flow of the water is deaerated, possibly filtered, and caused to flow at a substantially constant rate, and the branch flow is deionized and possibly simultaneously filtered. The essential features of this method comprise passing the deionized branch flow through a bed maintained at a substantially constant temperature and containing platinum or palladium acting as catalyst and supported on quartz particles, in which bed any soluble carbohydrates in the branch flow are oxidized with oxygen to uronic acids with the assistance of the catalyst, and that the electric conductivity or hydrogen ion activity in the branch flow which after the oxidation contains dissociated uronic acids, is measured during the flow of the branch flow.

The invention also relates to an apparatus for carrying the inventive method into effect, and this apparatus comprises a deaerator possibly combined with a filter, a pump for maintaining a substantially constant flow rate for a branch flow of a return flow of water in an industrial process, for instance condensate or feed water for the steam-generating plant in a sugar factory, and means for deionization and possibly simultaneous filtration of the branch flow. The essential features of this apparatus are a device receiving the deionized branch flow and comprising a bed maintained at substantially constant temperature and containing platinum or palladium acting as catalyst and supported by quartz particles, said bed being provided for oxidation with oxygen of any soluble carbohydrates contained in the branch flow to uronic acids with the assistance of said catalyst, and means receiving the branch flow from said device and adapted to measure the electric conductivity or hydrogen ion activity in the branch flow which after oxidation contains dissociated uronic acids during the flow of the branch flow.

The basic principle of the invention is that sugars, for instance saccharose, by catalytic oxidation with air is converted into uronic acids. These uronic acids are dissociated in water and can be measured by physico-chemical methods, such as the measuring of conductivity or hydrogen ion activity by means of a glass electrode in aqueous solution of the uronic acids. The conductivity or hydrogen ion activity of the solution will thus be a measure of the content of sugars. Before the solution is passed through the catalyst for oxidation, the inherent conductivity or hydrogen ion activity of the solution must be removed by deionization.

The method and apparatus of the invention will be explained in the following, references being had to the accompanying drawing which is a diagrammatic view of the apparatus according to the invention.

A cooler 1a is provided ahead of the apparatus of this invention which comprises seriatim a deaerator 1b provided with a conduit 1d for overflow or non-load flow and possibly combined with a filter, a volumetric pump 2, an ion exchange column 3 or an electrodialyser 4, a catalyst-containing bed 5 disposed in a thermostatically controlled metal block 5a, and an electric conductivity cell or pH electrode 6 provided in said metal block 5a and connected to an electric measuring equipment 7a, b, c.

During the continuous measuring, the branch flow is taken from the return flow of water to be investigated in the industrial process. The branch flow to be measured is introduced into the pump 2 which is a peristaltic tube pump of known type which gives a liquid flow per unit of time of preferably approximately 7 ml./min. As the deionizing means does not withstand temperatures higher than 50° C., the branch flow must be cooled if its temperature exceeds 50° C. The cooling is effected in the cooler 1a. Moreover, the branch flow must be freed from air bubbles and filtered, at least before it reaches the catalyst mass. The filtration protects the tubing of the pump against wear by particles contained in the branch flow, and also the catalyst-containing bed against colloidal contamination. The deionization being effected in an ion exchange column, the ion exchange mass thereof is an effective filter against colloids. The deaeration is absolutely necessary since air bubbles cause the catalyst mass and the ion exchange mass to form hard agglomerates, and then the branch flow in the conduits will not come into contact with active seats. The deaeration and the possible filtration are effected in the deaerator 1b. This arrangement also is a protection against dry running when the branch flow ceases. The water leaving the detector 6 then flows back to the filter and again passes the detector (non-load flow), and this recycling is maintained until the entering branch flow returns and overflows in the conduit 1d so that recycling is prevented.

The deionization device is required to lower the electric conductivity or hydrogen ion activity of the branch flow to such a low value that the increase in conductivity or hydrogen ion activity caused by traces of sugars can be measured. Moreover, the liquid volume in the device must be so small that an unnecessary delay of an entering branch flow containing sugars is avoided. The deionization device used in the method of the application consists either of the column with mixed ion exchangers 3 or the electrodialyser 4, or is a combination thereof. The deionization is preferably carried out by electrodialysis, in which case the branch flow is filtered prior to the deionization. The electrodialyser 4 is made of plastic and provided with ion exchange diaphragms of ion exchange resin. After deionization, the conductivity of the flow must not exceed $\mu$S./cm. (microSiemens per cm.), and the deionization device must be dimensioned according to the quality of the branch flow.

In the method of the invention, the catalyst consists of palladium or platinum which by reduction of a corresponding salt has been precipitated on quartz particles which must previously have been carefully cleaned by boiling with 50% hydrochloric acid and very carefully washed with water. The size of the quartz particles is preferably 0.3–0.5 mm. and the metal should be included in the catalyst mass to approximately 13% by weight (based upon the total weight of the quartz particles and the platinum or palladium). The catalyst-containing bed 5 is preferably provided in a metal block which can be adjusted by electric heating and a bimetallic thermostat to a given temperature such as 60°, 70° or 80° C. The bed is filled to 90% with the catalyst mass. The catalyst-containing bed 5 employed in the method of the invention is provided in a glass tube between filter discs and layers of fine-fibrous glass wool.

The oxidation in the presence of the catalyst is preferably carried out with an amount of oxygen dissolved in the branch flow. Operational runs have shown that the catalyst mass satisfies the requirements of stability and life. The carrier material, the quartz particles, have a sufficiently large surface area without adsorbing sugar, and laboratory tests and operational runs have shown that the catalyst mass has a considerably longer life than a catalyst mass where the catalyst carrier is active carbon.

The conductivity cell and the pH electrode 6, respectively, are also provided in the thermostat-controlled bock 5a. The conductivity cell 6 is of known construction with a cell constant of about 1.5 cm.$^{-1}$. A micro-combination electrode of known type is used for measuring the pH.

The dimensions and quality of the electric measuring equipment can be varied to conform to the use for which it is intended. For normal "warning" use, the conductivity cell is connected to a condutivity relay which is so connected that it closes a circuit when the conductivity exceeds a given value, i.e. upon the presence of sugars in the branch flow or the feed water. This circuit can then be employed to light a warning lamp and to automatically switch the feed water or the condensate so that return flow containing sugars goes to a drain. Instead of this relay, the conductivity cell can be connected to a complete conductivity measuring equipment and recorder (a conductometer) to obtain a record of the content of sugars. In this connection, use has been made of a calibration curve drawn up in a series test with solution having known contents. In one operational run, a lower sensitivity of 10 mg./litre has been obtained during which the conductivity increase exceeded the double blank value. It is, of course, possible to obtain both lower and higher values, depending upon the design of the equipment, and practical tests have produced a lower sensitivity of 3 mg./litre, but such a low value is not necessary in the industrial runs.

Laboratory test of condensate

Sugar-free condensate was collected in a sugar factory, and from this condensate samples with saccharose or soluble starch contents according to the table below were prepared. An apparatus of this invention was used to determine the saccharose or soluble starch content of the samples. Electric conductivity values were measured and recorded by a conductometer. The catalyst-containing bed and the conductivity cell of the apparatus were held at 70° C. The condensate samples were deionized by allowing the respective active samples to flow through two electrodialysis cells in a row which are supplied with a 50 v. direct current. Softened water, about 5 ml./min., for each electrode was pumped through the compartments. During the test the apparatus was supplied alternatingly with sugar-free condensate and with samples containing sugars, while the electric conductivity was continuously recorded, and after each supply changeover so much time was allowed to pass that constant recording was obtained. The following table shows the constant recording, each value being the mean value of three readings. No individual reading differed by more than 5% from the mean value.

TABLE

| Condensate | Content | | Conductivity, microSiemens/cm |
|---|---|---|---|
| | Saccharose, mg./liter | Soluble starch, mg./liter | |
| Sugar-free | | | 5.5 |
| | 10 | | 10.0 |
| | 25 | | 14.3 |
| | 50 | | 30.0 |
| | 100 | | 49.0 |
| Do | | | 5.5 |
| | | 25 | 12.0 |

What we claim and desire to secure by Letters Patent is:

1. A method of detecting traces of soluble carbohydrates in a return flow of water in an industrial process, comprising the steps of diverting a branch flow from the return flow, deaerating said branch flow, causing said branch flow to flow at a substantially constant rate, deionizing said branch flow, passing said deionized branch flow through a bed maintained at a substantially constant temperature and containing at least one member of the group consisting of platinum and palladium acting as catalyst and supported on quartz particles, for oxidizing with oxygen any soluble carbohydrates in said branch flow to uronic acids dissociated in said branch flow, and measuring the electric conductivity of said branch flow.

2. A method according to claim 1, further comprising the step of supplying oxygen dissolved in said branch flow for the oxidation in the bed.

3. An apparatus for detecting traces of soluble carbohydrates in a return flow of water in an industrial process, comprising a deaerator, a pump for diverting a branch flow from the return flow of water and for maintaining a substantially constant flow rate of said branch flow; means for deionization of said branch flow, bed means receiving said deionized branch flow and containing at least one member of the group consisting of platinum and palladium acting as catalyst and supported by quartz particles, for oxidizing with oxygen any soluble carbohydrates contained in said branch flow to uronic acids with the assistance of the catalyst, means for maintaining said bed means at a substantially constant temperature, and means receiving said branch flow from said bed means for measuring the electric conductivity of said branch flow.

4. An apparatus according to claim 3, wherein said means for maintaining said bed means at a substantially constant temperture comprise a metal block enclosing said bed means, and electric heating means and thermostatic means for maintaining said block at a substantially constant temperature.

5. An apparatus according to claim 3, wherein said bed means contain the catalyst precipitated on the quartz particles in an amount of about 13% by weight, based upon the total weight of the quartz particles and the catalyst, the quartz particels having a size of 0.3–0.5 mm.

References Cited

Browne, C. A. et al.: Physical and Chemical Methods of Sugar Analysis (1941), pp. 659–661.

Pigman, W.: The Carbohydrates, pp. 314–325, 607–608 (1952).

MORRIS O. WOLK, Primary Examiner

E. A. KATZ, Assistant Examiner

U.S. Cl. X.R.

23—253; 210—25